INVENTOR
W. M. GOODALL
BY H. O. Wright
ATTORNEY

INVENTOR
W. M. GOODALL
BY H. O. Wright
ATTORNEY

INVENTOR
W. M. GOODALL
BY H. O. Wright
ATTORNEY

Patented Feb. 16, 1954 2,669,608

UNITED STATES PATENT OFFICE 2,669,608

NOISE REDUCTION IN QUANTIZED PULSE TRANSMISSION SYSTEMS WITH LARGE QUANTA

William M. Goodall, Oakhurst, N. J., assignor to Bell Telephone Laboratories, Incorporated, New York, N. Y., a corporation of New York Application October 27, 1950, Serial No. 192,578

9 Claims. (Cl. 179—43.5)

This invention relates to methods of and apparatus for improving transmission in quantized modulation intelligence transmission systems, so that certain difficulties, encountered as the number of quanta steps employed by such systems is reduced (and the size or amplitude of each resulting "quanta" is, necessarily, correspondingly increased), can be substantially eliminated. With more particularity, the arrangements of the invention are designed to effect a redistribution or a masking of the "noise" arising from the process of quantizing so that the tendency in such systems to develop noticeable amounts of regularly repeated noise effects, or, in television systems, well defined "contour lines" between adjacent amplitude levels of quantization, as the number of steps is reduced, is, to a considerable degree, counteracted.

Numerous intelligence transmission systems employing quantization of signal samples are well known to those skilled in the art. By way of example, reference may be had to the articles, "Pulse code modulation," by H. S. Black and J. O. Edson, published in 1947 in the transactions of the American Institute of Electrical Engineers, vol. 66, at pages 895 to 899; "Telephony by pulse code modulation," by applicant, published in the Bell System Technical Journal, vol. 26, No. 3, for July 1947, at pages 395 to 409; and "An experimental multichannel pulse code modulation system of toll quality," by L. A. Meacham and E. Peterson, published in the Bell System Technical Journal, vol. 27, No. 1, for January 1948, at pages 1 to 43. Of interest also in connection with some of the systems using quantization is the article entitled "Electron beam deflection tube for pulse code modulation," by R. W. Sears, published in the Bell System Technical Journal, vol. 27, No. 1, for January 1948, at pages 44 to 57.

The basic features in the operation of such systems are, briefly, that the original signal to be transmitted is sampled, at a rate slightly in excess of twice the highest frequency present in the signal, to create a pulse amplitude-modulated signal representative of the original; that the samples are individually "quantized," i. e., classified as falling within a particular one of a plurality of amplitude levels or steps; that, for pulse code modulation, each sample is converted into a plurality of pulses of equal amplitude, spaced in time to represent the proper amplitude level or step in an appropriate and convenient code system; that the code pulses are transmitted to the receiving station where they are decoded and converted back into a pulse-amplitude modulated signal; and that the pulse-amplitude modulated signal thus obtained at the receiver is converted back into a signal having substantially the characteristics of the original signal.

In systems of the above-described types, the processes of "sampling" and "quantization" introduce perceptible amounts of unwanted electrical energy having the general character of "noise" but usually distinguishable from the latter by having a regularly repetitive character, whereas "noise" is normally of a random and irregular character.

The lower the number of steps, or amplitude levels, into which the pulse-amplitude modulated signal (obtained by the sampling of the original signal) is quantized, the more troublesome is the unwanted regularly recurrent energy introduced by the quantizing process as mentioned above, since its predominant frequencies are more likely to fall within the same range of frequencies as that employed in the transmission of the wanted signal. Consequently, though a relatively small number of steps or levels (16 to 32, for example), would suffice in many instances to enable the recovery of a good quality of reconstruction of the original signal at the far, or receiving, end of the system, the above-described unwanted energy introduces appreciable distortion or interference. This distortion or interference in the case of audio signals will appear as regularly repetitive "noise." In the case of video signals, it will appear as unwanted "contour lines" on the picture of the cathode-ray oscilloscope where changes of shading along definitely distinguishable lines become apparent.

In accordance with one feature of the present invention, the objectionable results above described are to a large extent mitigated by introducing an additional square wave with the original signal, the square wave having an amplitude of substantially one half the amplitude of a quantizing step and a frequency of one half the sampling frequency so that half the samples will be caused to fall into the next higher or the next lower step than in the absence of the added square wave. The effect obtained is virtually that which would be obtained if the number of quantizing steps were doubled, but it is much easier, cheaper, and convenient to introduce the square wave than to provide for actually doubling the number of quantizing steps by the methods employed in the prior art. When the number of steps is effectively doubled by adding a square wave of one half of the sampling frequency, much of the resulting distortion as well as the fundamental and harmonics of the square wave are rejected by a low pass filter that, in many pulse systems of the types mentioned above, is normally employed in the output of the system. When the frequency of the added square wave is less than one half of the sampling frequency the filter normally used will not remove the fundamental of the added wave. If the filter cut-off is lowered, important components of the wanted signal will also be rejected.

In accordance with another feature of the invention, a controlled amount of random noise is deliberately introduced with or without the above-described additional square wave signal, as will presently appear, together with the original signal. The random noise serves to mask out the regularly repetitive "noise" introduced by the quantizing process or, in video terms, to break up the definite contour lines on the cathode-ray screen picture so that they are much less noticeable, if indeed they are at all perceptible.

Other features of the invention are concerned with alternative ways of introducing the square wave, or random noise, or both, into particular circuit elements of systems of the general character described above and will be more readily perceived from the detailed description of the circuits given below.

The primary object of the invention is to permit the reduction of the number of quantizing steps required in pulse code modulation and similar systems, by reducing, masking, or substantially eliminating the regularly repetitive "noise" introduced by the quantizing process.

Other objects will become apparent from the detailed description of illustrative circuit arrangements given below and from the appended claims.

The principles and methods of the invention will be more readily understood when considered in the light of the accompanying drawings and the descriptions of specific preferred embodiments given below.

Figure 1:
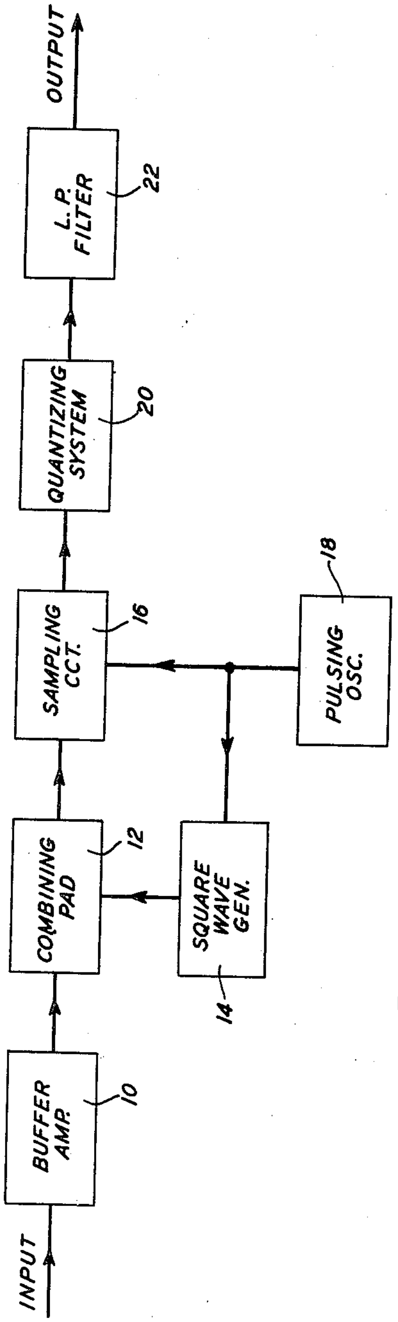
Fig. 1 illustrates, in block schematic diagram, form, one method of introducing a square wave with the original signal in accordance with a feature of the invention.

In more detail in Fig. 1, the input signal, which can be an audio, a video, a radio frequency, a microwave, a multiplexed group of audio channels, or substantially any simple or complex communication signal it is desired to transmit, is introduced into the buffer amplifier 10. The buffer amplifier 10 can be of conventional design for the type of signal to be transmitted. As its name implies, it serves to isolate the input circuit from the system and prevents the added square wave from being transmitted back into the input line.

The output of amplifier 10 and the output of square wave generator 14 are connected through the combining pad 12 to the sampling circuit 16.

The square wave generator 14 can be, for example, a conventional multivibrator circuit adapted to respond to every other pulse received from the pulsing oscillator 18.

The combining pad 12 can comprise conventional adjustable resistance pads. The function of this unit is to effect the combination of the input signal from amplifier 10 and the square wave from generator 14 and permit these combined signals to be introduced into the sampling circuit 16. At the same time the combining pad 12 should maintain good impedance matches with the several units mentioned and provide for the proper adjustment of the relative levels of the input and the square wave signals. The design of such pads has reached a high degree of development in the art as exemplified, for example, by the articles entitled "Mixer and fader circuit designs," by P. B. Wright, published in the magazine "Communications" for November and December 1943, page 44 both issues, and "Designing resistive attenuating networks or pads," by P. K. McElroy, published in the Proceedings of the I. R. E., volume 23, No. 3, pages 213 to 233, for March 1935. Alternatively, a buffer amplifier can be employed on each circuit preceding the junction, as will be illustrated hereinunder in Figs. 4 and 5.

Figure 5:
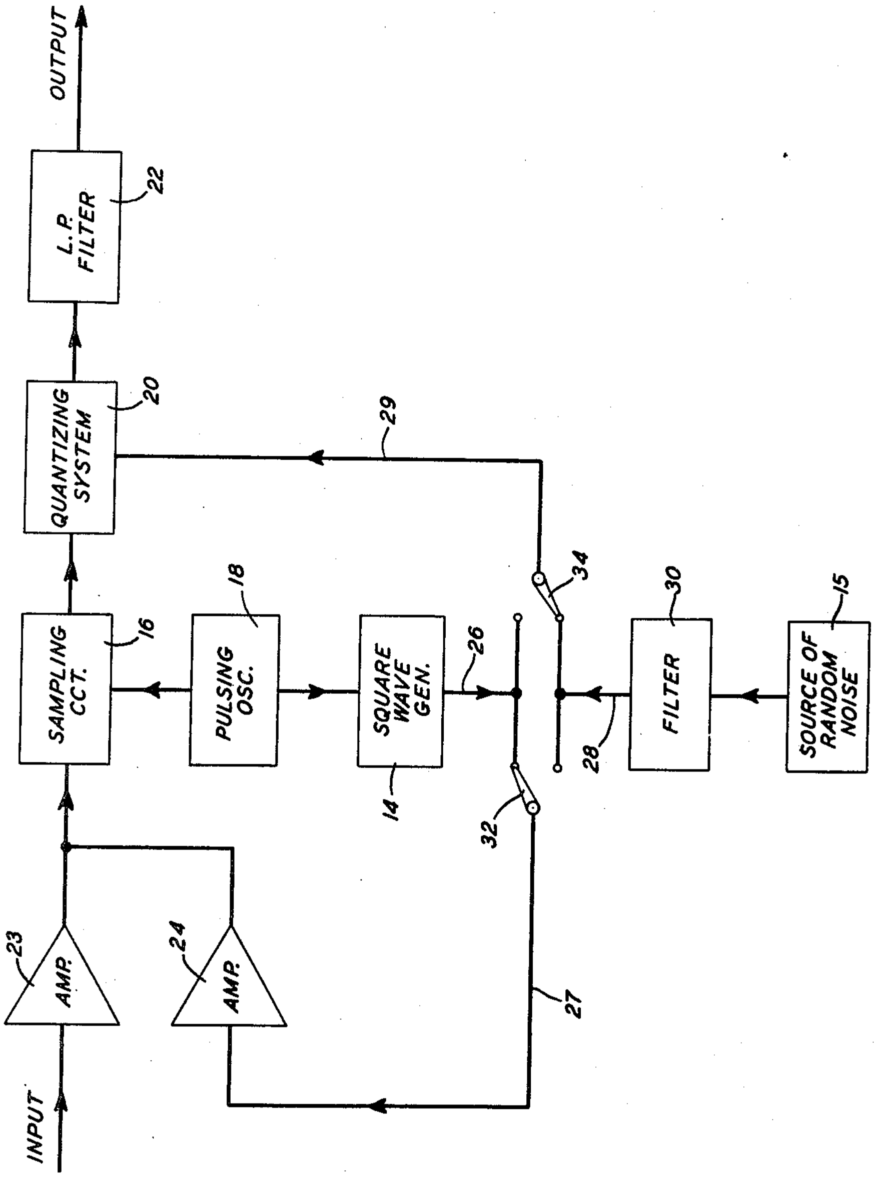
Fig. 5 illustrates, in block schematic diagram form, a further circuit of the invention in which both a square wave and random noise can be introduced together with the signal wave.

The pulsing oscillator 18 can be a source of short pulses, such, for example, as the circuit shown in Fig. 5 of applicant's United States Patent 2,449,467, granted September 14, 1948, or any of the numerous similar circuits well known in the art, so long as the sampling rate corresponds to a frequency at which it is feasible to operate such circuits. At very high frequencies, for example, at frequencies above a megacycle, a sine wave oscillator can be employed, as is shown and described, for example, in the copending application of C. B. H. Feldman, Serial No. 173,178, filed July 11, 1950, and assigned to applicant's assignee. This application issued as United States Patent 2,627,574, granted February 3, 1953. The sampling rate, as has been previously stated, should be slightly in excess of twice the highest frequency present in the input signal.

Sampling circuit 16 can, for example, take the form shown in Fig. 12b at page 27 of the above-mentioned article by Meacham and Peterson.

In accordance with conventional practice, as described above and particularly in the Black-Edson, Goodall, and Meacham-Peterson articles mentioned above, the output of sampling circuit 16 comprises a pulse-amplitude modulated signal which is introduced into the input of the quantizing system 20. This system 20 can comprise, as described in the three above-mentioned articles, a quantizing circuit, a coding circuit, a transmission system interconnecting the sending station with a remote receiving station and including an appropriate number of repeater stations if the distance between the transmitting and receiving stations is great enough to require repeaters, and at the receiving station a decoding circuit which converts the coded signal back to a pulse-amplitude modulated signal. A low-pass filter 22 can then be inserted in the output of system 20 to remove substantially all the "noise" resulting from the sampling, quantizing and decoding operations of system 20, provided pseudo (or actual) doubling of the number of quantizing steps has been effected, as described in detail above. By way of example, if the overall system of Fig. 1 is to pass a video signal approximately 5 megacycles wide, low-pass filter 22 can be designed to suppress all frequencies above 5 megacycles, while freely passing all frequencies below 5 megacycles; and a substantial portion of the quantizing "noise" will then be eliminated from the output of low-pass filter 22, and a good facsimile of the original signal is obtained.

Figure 2:
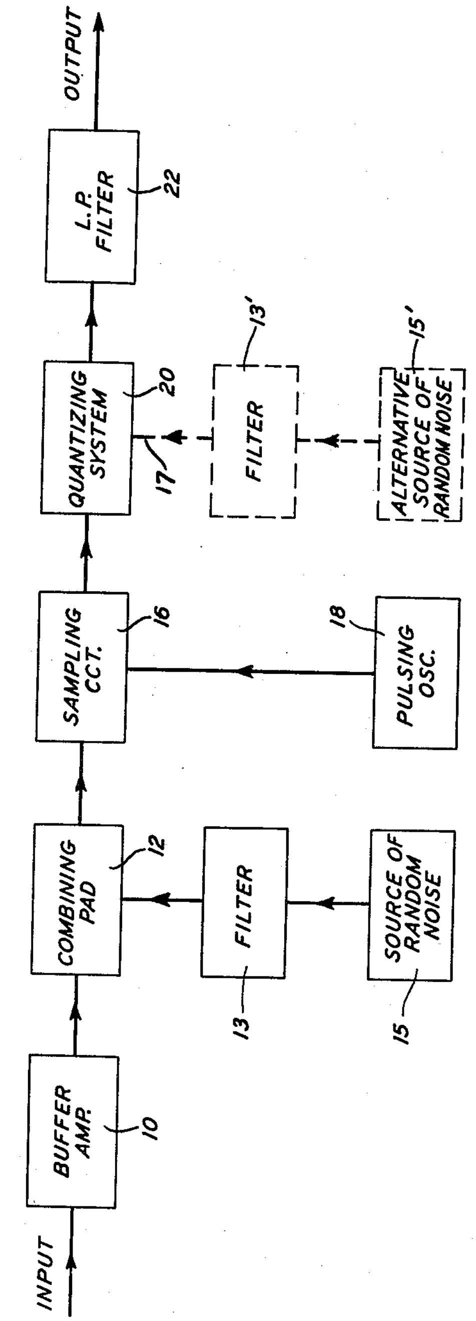
Fig. 2 illustrates, in block schematic diagram form, the introduction of random noise with the original signal, in accordance with another feature of the invention.

In Fig. 2, a circuit similar in general to that shown in Fig. 1 is shown, the like units of the two figures bearing like designation numbers. The unit 15, or 15', of Fig. 2 replaces the square wave generator 14 of Fig. 1. Unit 15, or 15', is a source of random noise which is combined with the input signal, either at the combining pad 12 or at the input end of the quantizing system 20, respectively. No connection between pulsing oscillator 18 and the source of random noise is, of course, required.

Any conventional source of random noise can be employed, as, for example, those described in the article entitled "Electrical noise generators," by J. D. Cobine and J. R. Curry, published in the Proceedings of the Institute of Radio Engineers, volume 35, for September 1947 at page 875, and in the article entitled "Noise generators and measuring technics," by I. J. Melman, published in the magazine Tele-Tech for May 1950, at page 28.

Where higher frequency or microwave signals are being transmitted, the noise source described in the copending application of W. W. Mumford, Serial No. 98,553, filed June 11, 1949, and assigned to applicant's assignee, can conveniently be adapted for use in the arrangements of the present invention, as will be immediately apparent to those skilled in the art.

The "level" (or power) of the random noise is adjusted to a value which provides the most effective masking of the noise resulting from the quantizing process without substantial degradation of the signal (or, for video, the picture) quality.

A filter 13, or 13', is preferably provided, interposed between the noise source 15 or 15', respectively, and the system. It can normally serve two purposes, the first being to remove frequencies outside the normal range of frequencies in the signal being transmitted and the second being to confine the noise introduced to a more narrow frequency range which in some instances has been found to result in more effective masking with less signal degradation. By way of example, with video signals, improvement in the signal quality has been observed when the random noise frequencies are limited by a filter in the output circuit of the noise source to the upper portion of the normal frequency spectrum of the signal. Depending upon the specific characteristics of any particular other type of signal, the random noise may be found to be more beneficial if limited to some other particular portion of the normal frequency spectrum for the particular signal.

When the alternate position of the source of random noise in the system, indicated by the dash-line unit 15', filter 13', and connecting line 17, is used, the unit 15, filter 13, and its connection to pad 12 can, of course, be omitted. If a coding tube such as is described, for example, in the above-mentioned article by R. W. Sears is employed in quantizing system 20, the filter 13' associated with the random noise source 15' can be connected either to the same deflecting plates as those to which the output of sampling circuit 16 are connected, or a special additional set of deflecting plates adjacent to and parallel with the regular set can be built into the tube.

Figure 3:
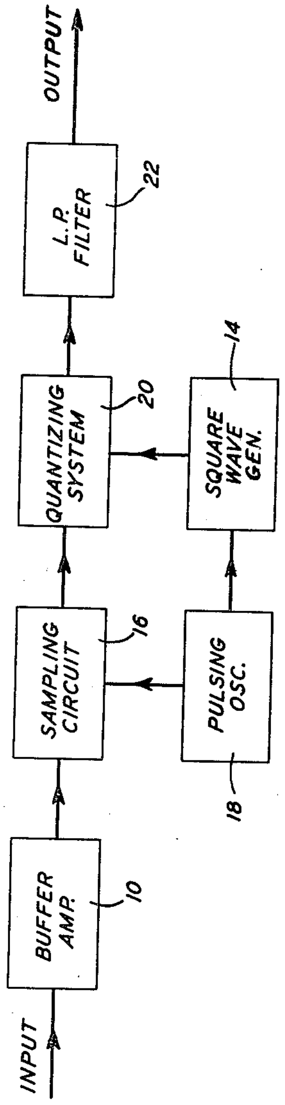
Fig. 3 illustrates, in block schematic diagram form, an alternative method of introducing a square wave with the original signal in accordance with a feature of the invention.

In Fig. 3, an alternative arrangement of the circuit of Fig. 1 is shown and differs from Fig. 1 only in the omission of combining pad 12 and the connection of the output of square wave generator 14 directly into the input of the quantizing system 20 substantially as described above for the connection of filter 13' and random noise source 15' in the system of Fig. 2.

Figure 4:
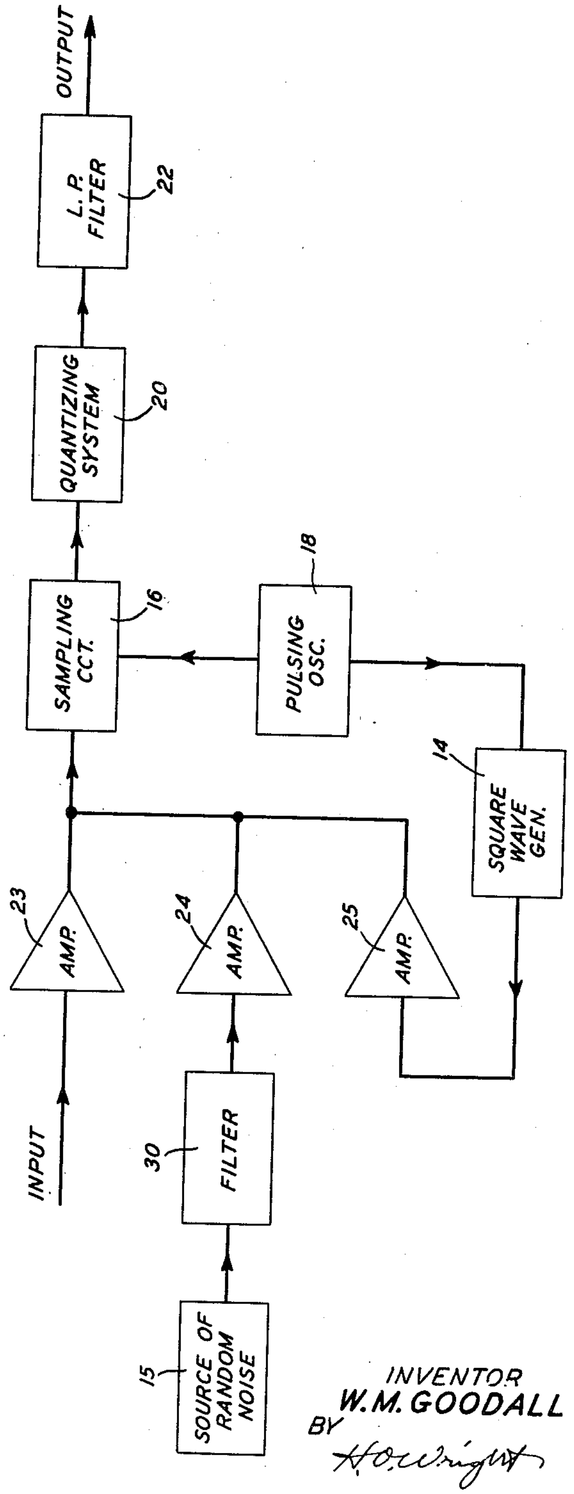
Fig. 4 illustrates, in block schematic diagram form, a circuit of the invention which provides for the introduction of both a square wave and random noise together with the signal wave.

In Fig. 4, a circuit arrangement of the invention is shown in which provision is made to add both random noise and a square wave to the regular input signal for the purposes of improving the operation of the over-all system as discussed in detail above.

In Fig. 4, an alternative method of connecting three circuits together and preventing mutual interaction between them is represented by the three buffer amplifiers 23, 24, and 25. The regular signal to be transmitted is introduced through buffer amplifier 23. Random noise is introduced, after passing through filter 30, through buffer amplifier 24. The square wave from generator 14 is introduced through buffer amplifier 25. The outputs of all three amplifiers are connected to the input of sampling circuit 16. The remainder of the circuit and its components are identical with Fig. 1, like components bearing corresponding designation numbers. The over-all circuit combines the advantages of adding a square wave and of adding random noise so that a higher quality signal will be obtained from the output of filter 22.

In Fig. 5 a further circuit arrangement of the invention is shown in which by means of the two single pole double throw switches 32 and 34 either the output of the random noise source 15 with filter 30 in its output circuit (lead 28), or the square wave generator 14 (lead 26) can be connected to buffer amplifier 24 (lead 27) and the other of these units can be connected to the quantizing system 20 (lead 29). That is to say, the circuit of Fig. 5 permits either source 15, or generator 14, to be connected to sampling circuit 16, and the other of these two units to be connected to system 20. Depending upon the characteristics of the signal being transmitted a particular setting of switches 32 and 34 will be found more beneficial. It is also entirely feasible to leave one or both of switches 32 and 34 open so that it can be readily determined how much improvement can be effected by either or both corrective devices for each of the two possible ways of connecting each device into the circuit. The remaining apparatus units of Fig. 5 are identical with the correspondingly numbered units of Figs. 1 to 4, inclusive, and are described in detail above.

Numerous and varied additional applications of the principles of the present invention will readily occur to those skilled in the art. The above-described systems and circuits are merely illustrative, and no attempt to exhaustively cover all possible arrangements within the spirit and scope of the invention has been made.

What is claimed is:

1. An intelligence transmission system of the type in which the original signal to be transmitted is converted first by an amplitude sampling circuit into a pulse-amplitude modulated signal, which pulse-amplitude modulated signal is then converted into a pulse-code modulated signal by an amplitude quantizing system, the latter signal being transmitted to a distant receiving point at which point it is decoded by said quantizing system to reconstruct said pulse-amplitude modulated signal which last-mentioned reconstructed signal can then be employed to recreate a virtual replica of said original signal, and means for adding at a point on the input side of the quantizing circuit of said system a square wave having an amplitude of substantially one half the amplitude of a quantizing step of said amplitude quantizing system and a frequency which is independent of the signal to be transmitted and is at all times substantially one half the sampling frequency of said amplitude sampling circuit, said means comprising a square wave generator the output of which is added to said original signal prior to its introduction into said quantizing circuit, and means for synchronizing said square wave generator to one half the sampling frequency of said sampling circuit.

2. The system of claim 1 and a low-pass filter connected on the output side of said quantizing subsystem, said filter freely passing all frequencies of said original signal but suppressing all frequencies higher than the highest frequency of said original signal, whereby "noise" resulting from the process of quantization at frequencies exceeding the highest frequency of said original signal, is substantially eliminated without substantially degrading the output signal from said quantizing system.

3. An intelligence transmission system of the type which employs a pulse-amplitude modulating circuit followed by means for quantization of the pulse-amplitude modulated signal into a predetermined number of definite amplitude levels, means for adding to said system a square wave having an amplitude of substantially one half the amplitude of a quantizing step of said system, and a frequency which is independent of the signal to be transmitted and is at all times substantially one-half that of said pulse-amplitude modulating circuit, said last-stated means comprising a square wave generator the output of which is introduced into the signal circuit of said system on the input side of said means for quantization and means for synchronizing said square wave generator to one-half the sampling frequency of said pulse-amplitude modulating circuit whereby an effect substantially simulating that of doubling the number of quantizing steps is obtained.

4. An intelligence transmission system of the type which employs a pulse-amplitude modulating circuit followed by means for quantization of the pulse-amplitude modulated signal into a predetermined number of definite amplitude levels, a source of random electrical noise and an electrical volume control device interconnecting the output of said source of random electrical noise and said transmission system at a point in said system prior to that at which quantization is effected.

5. An intelligence transmission system of the type which employs a pulse-amplitude modulating circuit followed by means for quantization of the pulse-amplitude modulated signal into a predetermined number of definite amplitude levels, a generator of a square wave having a frequency of one-half that of the pulse-amplitude and an amplitude of substantially one-half the average amplitude difference between said amplitude levels modulation, a source of random electrical noise and means for severally and independently electrically connecting said square wave generator and said source of random electrical noise at points in said system prior to that at which quantization is effected.

6. An intelligence transmission system of the type in which the original signal to be transmitted is converted first by an amplitude sampling circuit into a pulse-amplitude modulated signal, which pulse-amplitude modulated signal is then converted into a pulse-code modulated signal by an amplitude quantizing system, the latter signal being transmitted to a distant receiving point at which point it is decoded by said quantizing system to reconstruct said pulse-amplitude modulated signal which last-mentioned reconstructed signal can then be employed to recreate a virtual replica of said original signal, and means for adding at a point on the input side of the quantizing circuit of said system a square wave having an amplitude of substantially one-half the amplitude of a quantizing step of said amplitude quantizing system and a frequency which is independent of the signal to be transmitted and is at all times substantially one-half the sampling frequency of said amplitude sampling circuit, said means comprising a square wave generator the output of which is electrically connected to said transmission system at a point preceding the input of said quantizing circuit, the timing circuit of said square wave generator being electrically connected to said sampling circuit.

7. An intelligence transmission system of the type which employs a pulse-amplitude modulating circuit followed by means for quantization of the pulse-amplitude modulated signal into a predetermined number of definite amplitude levels, a source of random electrical noise, a band-pass electrical wave filter connected to the output of said source, said filter passing a portion only of the frequency spectrum produced by said source, and means for inserting a controlled amount of said filtered random noise into said system at a point prior to that at which quantization is effected, said last-stated means comprising an electrical combining pad electrically interconnecting the output of said filter and said system at said point.

8. An intelligence transmission system of the type in which the intelligence signal is converted into a pulse-amplitude modulated signal which signal in turn is quantized into a definite number of quanta or steps, a generator of a square wave having an amplitude of one-half the amplitude of the quanta or steps employed by said system and a frequency of one-half the pulse frequency of said pulse-amplitude modulated signal, a source of random noise, a filter passing a portion only of the frequency spectrum of said noise source said filter being connected to the output of said noise source and means for introducing the square wave at one point in said system and the output of said filter at another point in said system, both said points preceding the point at which quantization is effected and switching means for interchanging the points at which said square wave and said filter output are respectively introduced.

9. A transmission system which includes a portion in which the normal input signal is sampled and then quantized, a source of random noise, a filter connected to the output of said noise source, said filter transmitting only a small portion of the frequencies within the normal frequency spectrum of said signal and means for introducing the output of said filter into said transmission system at a point prior to that at which quantization is effected.

WILLIAM M. GOODALL.

References Cited in the file of this patent

UNITED STATES PATENTS

| Number | Name | Date |
|---|---|---|
| 2,034,704 | Nokoshima | Mar. 24, 1936 |
| 2,592,061 | Oxford | Apr. 8, 1952 |